Patented Jan. 20, 1942

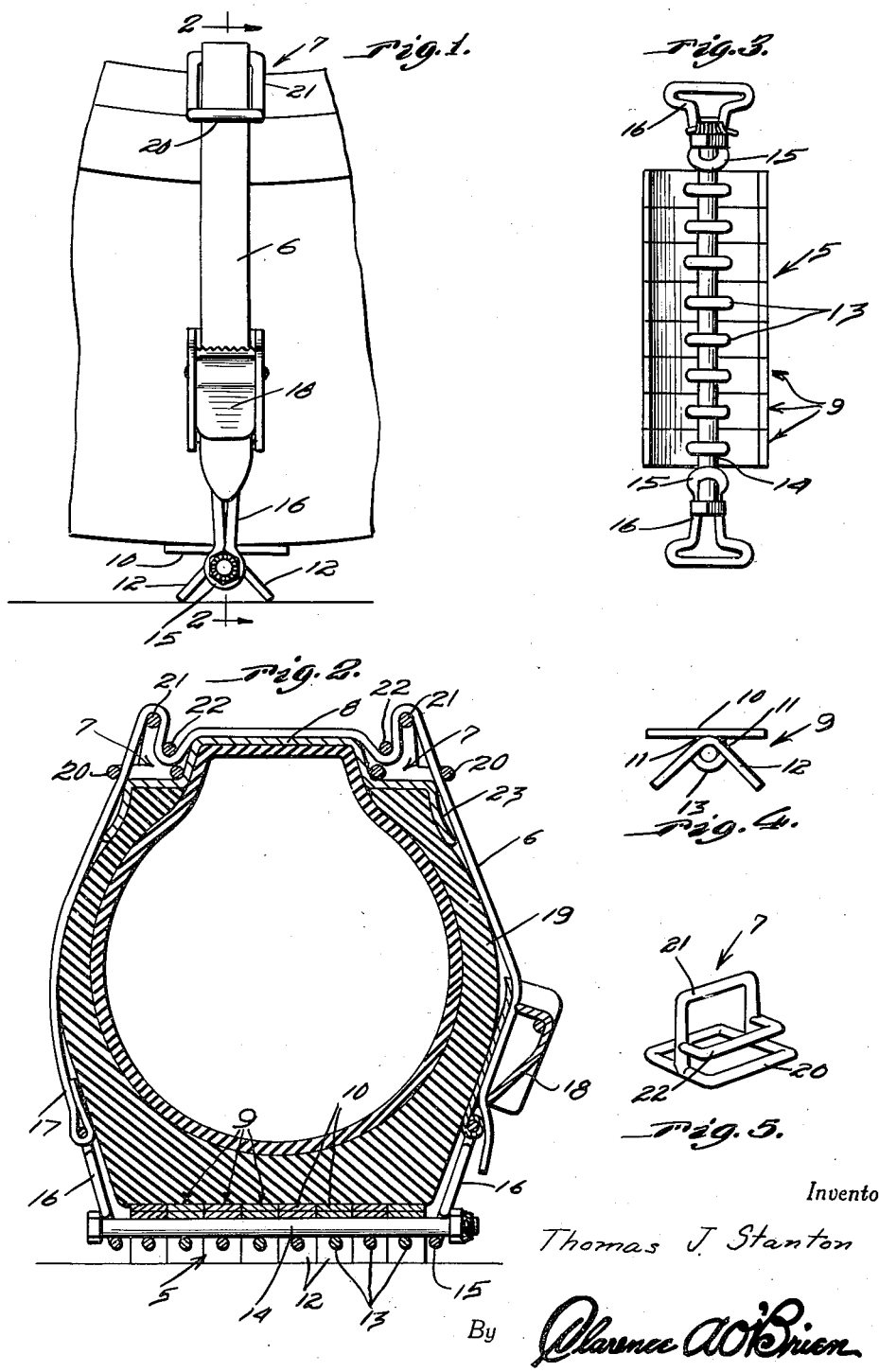

2,270,692

UNITED STATES PATENT OFFICE 2,270,692

ANTISKID DEVICE

Thomas J. Stanton, Elizabeth, N. J.

Application February 5, 1941, Serial No. 377,567

3 Claims. (Cl. 152—222)

This invention relates to anti-skidding devices intended to be applied to the tires of automotive or other vehicles for preventing skidding of the vehicle and to improve its traction, and among the objects of the invention is to improve generally upon such types of devices as are now known and used.

One of the salient objects of the invention is to provide a device of this character which when secured to the tire will be held securely thereon against slipping.

The invention together with its objects and advantages will be best understood from a study of the following description taken in connection with the accompanying drawing wherein:

Figure 1 is a fragmentary side elevational view of a rim and tire assembly illustrating the application of the device thereto, Figure 2 is a vertical sectional view taken substantially on the line 2—2 of Figure 1.

Figure 3 is a plan view of a traction member forming part of the invention.

Figure 4 is a side elevational view of one of the elements of which the traction member is composed, and Figure 5 is a perspective view of a restraining element forming part of the invention.

Referring more in detail to the drawing it will be seen that in the preferred embodiment thereof, the anti-skidding device embodies a traction member indicated generally by the reference numeral 5; a strap 6 for securing the traction member 5 in position on the tire, and restraining elements 7 slidably associated with the strap 6 and coacting with the rim 8 for securing the device in position against slipping as will hereinafter be made manifest.

The aforementioned traction member 5 is composed of a plurality of elements 9, each of which consists of a narrow body-plate 10 to one side of which is welded or otherwise secured, as at 11, a substantially V-shaped lug 12.

The sides of the lug 12, opposite the angle thereof, are connected by an arcuate bridge member 13 that forms with the angle of the lug 12 an eye to accommodate a bolt 14 upon which a plurality of the elements 9 are arranged as shown to provide the aforementioned traction member 5.

Also in accordance with the present invention there is provided a pair of substantially T-shaped loops 16 formed of suitable rod material and shaped at the free ends of the stems thereof to provide eyes 15 which accommodate the bolt 14 as shown.

The strap 6 has one end thereof secured to one of the loops 16, as at 17, while suitably associated with the other of the loops 16 is a buckle 18 with which the free end of the strap 6 is engaged as shown in the drawing, after being passed around the tire 19 and rim 8, as shown in Figure 2, for securing the anti-skid device in position.

Each of the aforementioned restraining elements 7 is formed from wire rod or other suitable material and embodies a substantially frame-like body 20 to opposite members of which are secured the ends of an inverted U 21, and which legs of the U 21 are connected together by a substantially U-shaped bridge piece 22 that is disposed in a plane parallel to the body 20 and is spaced with respect to the body 20 as shown.

Two retaining elements 7 are slidably associated with each strap 6 and are disposed at opposite sides of the rim 8 to bear against the underside of the rim adjacent the flanges 23 thereof, as shown in Figure 2. In this connection it will be noted that the strap is trained through the body frame 20, then over the member 21, and then through the space between the body frame 20 and the bridge piece 22, and the retaining elements 7 function, after the strap 6 has been finally buckled in position, to retain the strap taut and under tension and thus the traction member 5 in such intimate contact with the tread of the tire casing 19 as to render the possibility of the device slipping relative to the tire, negligible, if not to entirely eliminate such possibility.

It will also be apparent from the foregoing that when the device is in final position on the tire the traction member 5 extends transversely of the tread of the tire with the body-plates 10 of the elements 9 in flat contact with said tread surface, anl the lugs 12 disposed to grip the ground surface and thus assist in giving traction to the wheel and at the same time prevent skidding or slipping of the wheel in all directions.

It is thought that the simplicity of the device from the standpoint of construction, assembly, number of parts and manner of application negatives further detailed description thereof.

It is, however, to be understood that while I have herein illustrated and described the preferred embodiment of the invention, I claim all such forms of the invention to which I am entitled in view of the prior art and scope of the appended claims.

Having thus described the invention what is claimed as new is:

1. In an anti-skid device of the character described, a traction member composed of a plurality of traction elements each of which embodies a body-plate adapted for bearing flatwise against the tread of a tire and a substantially V-shaped lug secured to and projecting from one side of said plate in a direction outwardly from the tire, each of said elements also being provided with an eye disposed adjacent to the angle formed between the sides of the V-shaped lug, and a single bolt threaded through the eyes of the traction elements to mechanically connect said elements together into a single traction member.

2. In an anti-skid device of the character described, a traction member composed of a plurality of traction elements each of which embodies a body-plate and a substantially V-shaped lug secured to and projecting from one side of said plate, each of said elements also being provided with an eye, and a bolt threaded through the eyes of the traction elements to mechanically connect said elements together into a single traction member; and loops on the respective opposite ends of said bolt, a retaining strap secured at one end thereof to one of said loops, and a buckle associated with the other of said loops for coaction with the free end of said strap in securing the traction device on a tire casing.

3. In an anti-skid device of the character described, a traction member composed of a plurality of traction elements each of which embodies a body-plate and a substantially V-shaped lug secured to and projecting from one side of said plate, each of said elements also being provided with an eye at the apex of its associated V-shaped lug, a bolt threaded through the eyes of the traction elements to mechanically connect said elements together into a single traction member, and loops on the respective opposite ends of said bolt for engagement with a retaining strap.

THOMAS J. STANTON.